United States Patent
Robinson et al.

(10) Patent No.: US 9,466,122 B1
(45) Date of Patent: Oct. 11, 2016

(54) INDEPENDENT COVARIANCE ESTIMATION AND DECONTAMINATION

(71) Applicant: Raytheon Company, Waltham, MA (US)

(72) Inventors: Ian S. Robinson, Redondo Beach, CA (US); Bradley Flanders, Whittier, CA (US); Anthony Sommese, Port Jefferson, NY (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 14/835,175

(22) Filed: Aug. 25, 2015

(51) Int. Cl.
*G06K 9/00* (2006.01)
*G06T 7/40* (2006.01)

(52) U.S. Cl.
CPC ..... *G06T 7/408* (2013.01); *G06T 2207/10004* (2013.01); *G06T 2207/10024* (2013.01)

(58) Field of Classification Search
CPC ............. G06K 9/0063; G06K 2009/00644; G06K 2009/4657; G06K 2209/21; G06K 9/00624; G06T 2207/10016; G06T 2207/10004; G06T 2207/10024; G06T 2207/10036; G06T 2207/30181; G06T 2207/30232; G06T 7/408
See application file for complete search history.

(56) References Cited

U.S. PATENT DOCUMENTS

| | | | |
|---|---|---|---|
| 6,678,048 B1 | 1/2004 | Rienstra et al. | |
| 6,687,620 B1* | 2/2004 | Haaland | G01N 21/274 702/22 |
| 6,804,400 B1 | 10/2004 | Sharp | |
| 7,194,111 B1* | 3/2007 | Schaum | G06K 9/0063 348/144 |
| 7,620,204 B2 | 11/2009 | Porikli et al. | |
| 8,203,114 B2 | 6/2012 | Robinson et al. | |
| 2013/0208944 A1 | 8/2013 | Rosario | |
| 2014/0185864 A1 | 7/2014 | Halper et al. | |
| 2014/0241633 A1 | 8/2014 | Flanders et al. | |
| 2015/0023553 A1 | 1/2015 | Rosario et al. | |

* cited by examiner

*Primary Examiner* — Phuoc Tran
(74) *Attorney, Agent, or Firm* — Burns & Levinson LLP; Joseph M. Maraia

(57) ABSTRACT

Methods and systems are provided for estimating background spectral content in a hyperspectral imaging (HSI) scene. A HSI processor computes a scene covariance matrix for each of a plurality of sparsely sampled pixel sets, identifies and removes the spectral content of contaminating pixels from the covariance matrices, and checks the consistency among the plurality of decontaminated covariance matrices, iteratively re-sampling and re-computing said matrices until an acceptable consistency is achieved, and then computes a final decontaminated covariance matrix representative of the background spectral content of the scene. Alternate approaches to pixel sampling, and/or using fewer spectral dimensions than are available for the pixels are presented.

12 Claims, 8 Drawing Sheets

INDEPENDENT COVARIANCE ESTIMATION AND DECONTAMINATION

CROSS REFERENCE TO RELATED APPLICATIONS

This application is related to U.S. application Ser. No. 14/561,873 filed Dec. 5, 2014, entitled "Rapid Iterative Detection", and Ser. No. 14/467,272 filed Aug. 25, 2014, entitled "Rapid Anomaly Detection". The entire teachings of the above applications are incorporated herein for all purposes.

BACKGROUND

This invention relates to imaging processing systems, and in particular methods and systems for extremely efficient estimation of spectral covariance matrices conveying information related to the background of a hyperspectral scene, including covariance matrices that have had outliers removed (decontaminated) for processing of spectral, especially hyperspectral imaging (HSI) data. The term "hyperspectral" refers to imaging narrow spectral bands over a continuous spectral range, and producing the spectra of all scene pixels in a hyperspectral scene.

In many conventional HSI systems, hyperspectral sensors collect data of an image from one spatial line and disperse the spectrum across a perpendicular direction of the focal plane of the optics receiving the image. Thus a focal plane pixel measures the intensity of a given spot on the ground in a specific waveband. A complete HSI cube scene is formed by scanning this spatial line across the scene that is imaged. The complete HSI cube may be analyzed as a measurement of the spectrum, the intensity in many wavebands, for a spatial pixel. This spatial pixel represents a given spot on the ground in a cross-scan direction for one of the lines at a given time in the scan direction. These data may be analyzed to separate and evaluate differing wavelengths, which may permit finer resolution and greater perception of information contained in the image. From such data, hyperspectral imaging systems may be able to detect targets or spectral anomalies, including materials, and changes to an image.

For any anomaly or target detection algorithm to be successful, the anomaly or target spectrum should be distinguishable from background spectra. Detection filters assume that targets are statistically rare in the scene and do not occupy very many pixels. The filters work against a wide distribution of backgrounds and are optimized for backgrounds that have a Gaussian distribution. A spectral covariance matrix COV may also be computed to determine the eigenvectors of the scene. To obtain a faithful representation of all eigenvectors, the covariance matrix must accurately represent the scene, which has often led others to avoid sampling pixels. Those that have tried sampling fewer pixels to construct the COV have found wildly varying covariance estimates.

Previous approaches to computing COV's have required $0.5*P*D^2$ operations to compute, where P is the number of pixels (e.g., $10^6$-$10^7$) or spatial locations in the scene, and D is the number of wavebands measured by the HSI sensor (e.g., 100-480). Typically, the scene background clutter is described by a mean vector and a covariance matrix. Possible presence of anomalies and/or targets in the background estimation data may skew the values of the spectral covariance matrix. This may lead to significant performance degradation; therefore, it is important that estimations be performed using sets of "target-free" pixels. Some prior approaches attempt to remove pixels that skew the COV, for example, by setting aside pixels with the top fraction (e.g., 1-2%) of RX anomaly scores. Removing outliers has been shown to significantly increase both anomaly detection scores and target detection scores, but is computationally expensive. Prior approaches use all non-contaminating scene pixels and all hyperspectral dimensions in the computation of detection scores for targets and anomalies. The computation of anomaly scores to identify contaminants requires an addition $P*D^2$ operations, and recalculation of the covariance matrix without these contaminants requires $0.5*P*D^2$ operations, resulting in the required number of computational operations to be on the order of $2P*D^2$ operations, Thus, what is needed is a highly computationally efficient and accurate estimation of the background spectral content of a HSI scene, represented by a spectral covariance matrix, especially one that has had outliers pixels removed ("decontaminated").

BRIEF SUMMARY OF THE INVENTION

In accordance with examples described below, methods of and systems for estimating background spectral content in a hyperspectral scene are provided, which enable background estimation, anomaly detection and/or target detection with fewer computations. Large reductions in operations are achieved in computing spectral covariance matrices COV, an important step in HSI processing preceding anomaly and target detections.

In some examples of the method, a HSI scene is provided comprised of spectra of a plurality P of scene pixels indicative of radiation absorbed by, or emitted from, scene materials in a plurality D of spectral dimensions. N pixel sets may be sampled, where each set may include a small fraction sf of scene pixels. For each of the $N_i$ pixel sets, a $COV_i$ may be computed, each $COV_i$ representing the variance and correlation of the spectral content of the associated pixel set from the mean of the spectral content of the HSI scene for that pixel set. Contaminating pixels may then be identified from among the sampled pixels, using at least one of the plurality D of spectral dimensions, and the spectral contributions from so identified pixels may be removed from each of the $COV_i$, in order to derive an associated plurality of $COVD_i$. The consistency among the plurality of $COVD_i$ may then be checked against a predetermined threshold (or in some examples, the consistency check may comprise simply determining whether a sufficient number of pixels have been sampled.) If the result of this check is acceptable, a final COVD may be computed by averaging the plurality of $COVD_i$. If the check indicates unacceptable results, the process may iteratively repeat using a greater number of scene pixels.

In some examples, the re-sampling of pixels may include the pixels sampled on the previous iteration, while in other examples only distinct pixels are sampled. The total number of scene pixels sampled to obtain satisfactorily consistent $COVD_i$ may comprise a small fraction of the total number of scene pixels available. For example, it has been shown that sampling less than ten percent (10%), and even less than one percent (1%) of scene pixels provides results comparable to using all available scene pixels in anomaly and target detection processes.

In some examples, identifying the contaminating pixels may involve using a small number of the available spectral dimensions, which may be dynamically adjusted as the process iterates to achieve consistent $COVD_i$.

In yet other examples, identifying contaminating pixels may involve computing an anomaly score $RX_M$ for each of the sampled scene pixels using a subset M of spectral dimensions fewer than the plurality D of available spectral dimensions. The anomaly score $RX_M$ for each of the sampled pixels may then be compared to a predetermined anomaly score threshold. The subset M may represent a subset of the D eigenvectors of the spectral covariance matrix that have eigenvalues above a threshold. Computing the anomaly score $RX_M$ for each of the sampled scene pixels may involve computing M eigenvector coefficients by unmixing the principal components from each scene pixel and dividing the resulting unmixing coefficients by the square root of the eigenvalue corresponding to the Mth eigenvector to obtain M whitened coefficients, and then computing $RX_M$ as the dot product of the M whitened coefficients with themselves. In other examples, the anomaly score $RX_M$ may be determined by computing M coefficients for an arbitrary set of basis vectors by unmixing the basis vectors from each scene pixel, and then calculating the covariance of the set of M coefficients for all scene pixels, and computing $RX_M$ as the Reed-Xiaoli anomaly score.

An exemplary system may include a memory having computer executable instructions thereupon, at least one interface receiving a hyperspectral imaging data for a plurality of scene pixels of a hyperspectral scene, and a covariance estimator implemented on one or more processors coupled to the memory and the at least one interface. When the computer executable instructions are executed by the covariance estimator, they cause the covariance estimator to sample N pixel sets each comprising a small number of scene pixels, and compute a $COV_i$, for each of the $N_i$ pixel sets, each $COV_i$, representing the variance and correlation of the spectral content of the associated pixel set from the mean of the spectral content of the hyperspectral scene for that pixel set. The estimator is further caused to identify contaminating pixels from among the sampled pixels using at least one of the plurality D of spectral dimensions, and decontaminate from each of the $COV_i$, the spectral contribution of the contaminating pixels, thereby deriving an associated plurality of $COVD_i$. The estimator is further caused to check whether the consistency of the plurality of $COVD_i$ is acceptable. If the consistency of the plurality of $COVD_i$ is acceptable, the estimator computes a final COVD by averaging the plurality of $COVD_i$. But if the consistency of the plurality of $COVD_i$ is unacceptable, the estimator iteratively repeats the sampling, computing, identifying, decontaminating, and consistency checking steps for a greater number of scene pixels.

In some examples of the tangible non-transitory computer-readable storage medium having computer readable instructions stored therein, when one or more HSI processors of the covariance estimator that are provided with a hyperspectral imaging data execute the instructions, they cause the one or more processors to sample N pixel sets each comprising a small number of scene pixels, and compute a $COV_i$ for each of the $N_i$ pixel sets, each $COV_i$ representing the variance and correlation of the spectral content of the associated pixel set from the mean of the spectral content of the hyperspectral scene for that pixel set. The one or more processors are further caused to identify contaminating pixels from among the sampled pixels using at least one of the plurality D of spectral dimensions, and decontaminate from each of the $COV_i$ the spectral contribution of the contaminating pixels, thereby deriving an associated plurality of $COVD_i$. The instructions further cause the one or more processors to check whether the consistency of the plurality of $COVD_i$ is acceptable. If the consistency of the plurality of $COVD_i$ is acceptable, the one or more processors compute a final COVD by averaging the plurality of $COVD_i$. But if the consistency of the plurality of $COVD_i$ is unacceptable, the one or more processors are caused to iteratively repeat the sampling, computing, identifying, decontaminating, and consistency checking steps for a greater number of scene pixels.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWING

The foregoing and other objects, features and advantages will be apparent from the following more particular description of the examples, as illustrated in the accompanying drawings in which like reference characters refer to the same parts throughout the different views. The drawings are not necessarily to scale, emphasis instead being placed upon illustrating the principles of the examples.

DETAILED DESCRIPTION OF THE INVENTION

Figure 1:
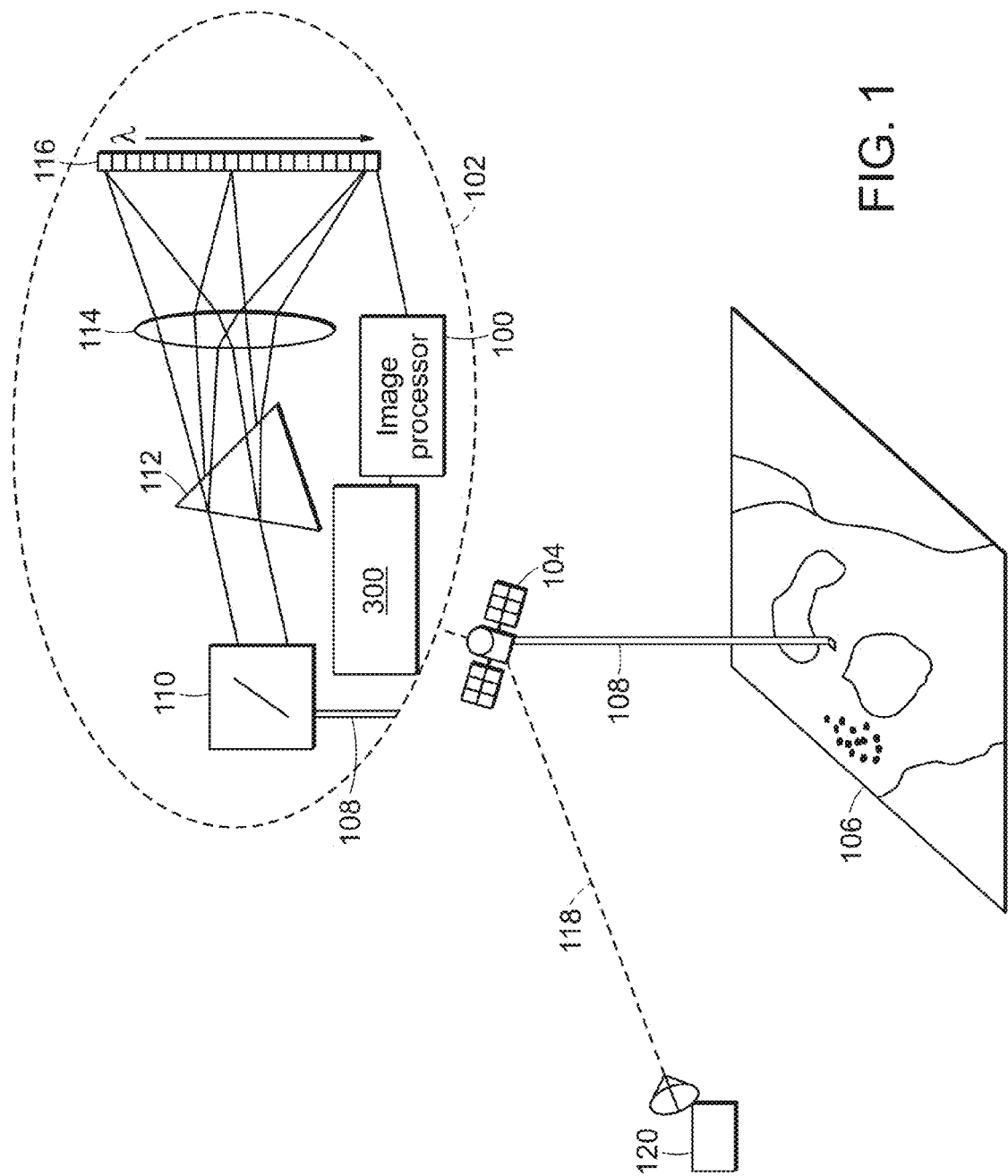
FIG. 1 is an illustration of an example imaging system with a covariance estimator.

In the description that follows, like components have been given the same reference numerals, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

I. Overview

Depicted in FIG. 1 is an example of imaging system 102 that is configured to process images of a scene 106 and to detect materials/targets/anomalies in backgrounds/scenes. By way of example only, imaging system 102 may be a HSI system. Imaging system 102 may be stationary or mobile, airborne or land based (e.g., through transmission 118 to a remote station 120 located on an elevated land structure or building), or may be on an aircraft or a satellite. As shown, imaging system 102 may incorporate image processor 100, and may be coupled to or otherwise contained within remote imaging system 104. Remote imaging system 104 may be of any suitable construction or configuration, including but not limited to comprising a satellite, an aerial surveillance system, or any other system that can capture images. Additionally, remote imaging system 104 may be stationary or mobile. In an example, imaging system 102 and remote imaging system 104 may be configured to capture one or more images of a particular scene 106 corresponding to a geographical area (e.g., a ground terrain).

In an example, remote imaging system 104 may be configured to use imaging system 102 to capture hyperspectral image(s) of scene 106 that are provided as input HSI scene to image processor 100. In an example, hyperspectral imaging system 102 may include one or more scan minors 110, or may include other optics arranged to receive light 108 reflected from one or more ground resolution cells. Light 108 reflected from one or more ground resolution cells, and generally the entire scene 106, may be used by image processor 100 to determine an input reflectivity of input HSI scene. Input HSI scene may be a part of scene 106, or may be the entire scene 106 depending upon specific target detection goals. In an example, scan minors 110 or the other optics may then direct light 108 through dispersing element 112, which may be arranged to separate light 108 into various different wavelengths (i.e., a spectra). After being separated into the various different wavelengths, light 108 may then be directed to one or more imaging optics 114, which may focus the various wavelengths onto a focal plane of detector array 116. As such, detector array 116 may capture hyperspectral data across the spectrum of wavelengths, thereby generating a data set corresponding to a hyperspectral image of scene 106.

Figure 2:
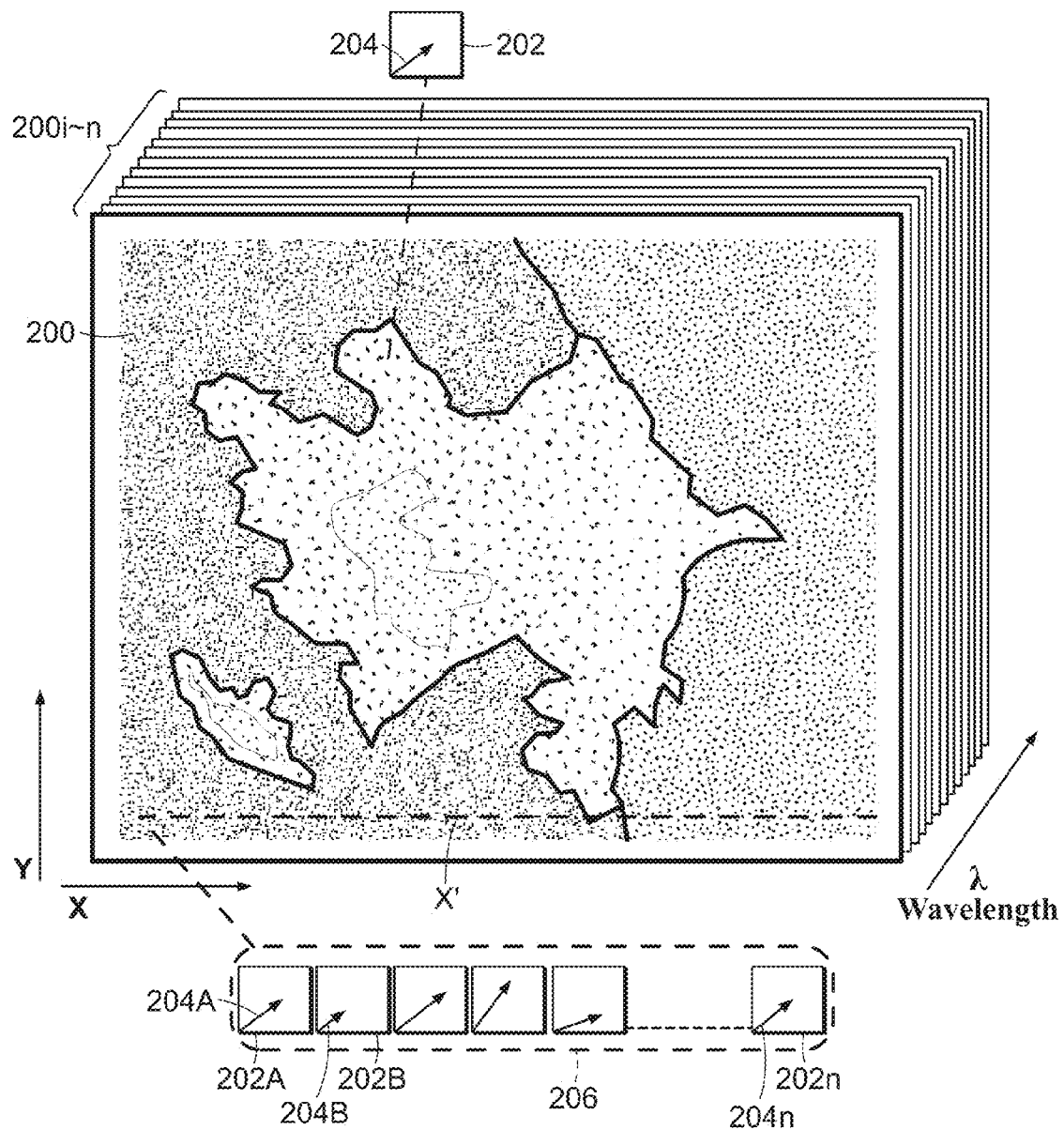
FIG. 2 is an illustration of an example representation of one or more images of a hyperspectral scene including a plurality of scene pixels.

FIG. 2 provides an exemplary representation of hyperspectral image 200, which may generally include a plurality of images 200$i$-$n$, which may be acquired in a substantially simultaneous manner across various different wavelength ($\lambda$) bands. As shown in FIG. 2, the hyperspectral image 200 may include a plurality of scene pixels 202 arranged according to an x-y coordinate system, although it will be apparent that alternate coordinate systems may be employed in various circumstances. (A scene pixel can also be referred to as "spatial pixel" or simply "pixel," all of which may be used interchangeably herein.) In one example, each respective scene pixel 202 may have a spectral vector 204 associated therewith, wherein the spectral vector 204 may contain one or more spectral measurements representing energy associated with the respective scene pixel 202. For example, FIG. 2 further illustrates an enlarged section 206 representing a particular row X' of scene pixels 202$a$-$n$ from one of the plurality of images 200$i$-$n$, wherein each of the various scene pixels 202$a$-$n$ in the row X' may have a spectral vector 204$a$-$n$ representing the energy associated with the respective pixel 202.

II. Example Hyperspectral Image Processing System

Figure 3:
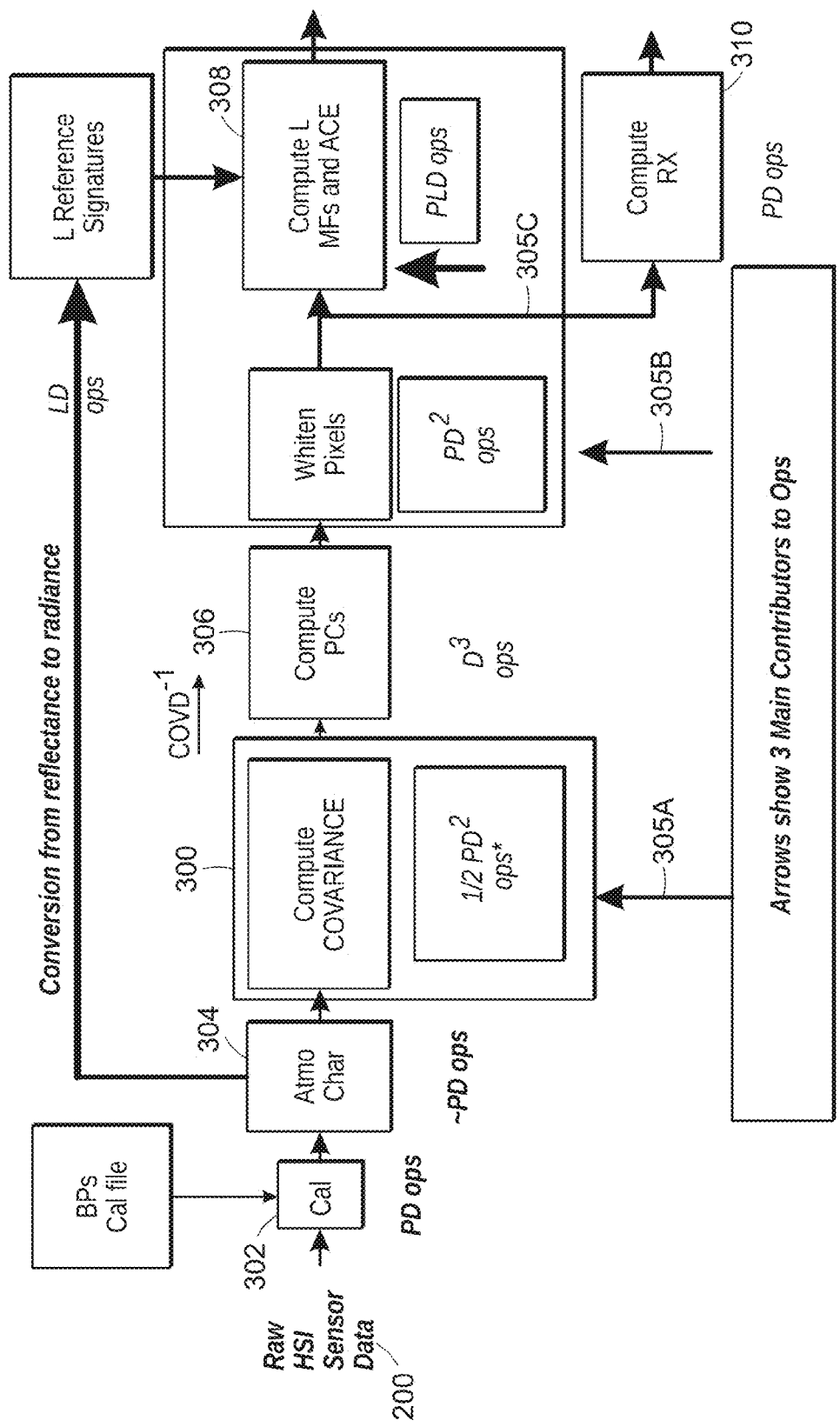
FIG. 3 is a functional block diagram of an example of a hyperspectral imaging process.

An example HSI processing chain that may be utilized by HSI processor 100 is illustrated in FIG. 3. Processing of HSI images 200 may involve, after converting the raw sensor data into radiance (Cal module 302) and extracting atmospheric information (atmosphere characterization module 304), estimating the scene spectral covariance (covariance estimator 300) to describe the natural variation of spectra in the scene (the scene clutter.) From the inverse of the spectral covariance matrix created by covariance estimator 300, PC compute module 306 computes the principal components, comprising the eigenvalues and eigenvectors of the HSI scene 106, which in turn are used in target detection (detector 308) and/or anomaly detection (detector 310.)

The primary contributors to computational operations in typical HSI processing are indicated in FIG. 3 by arrows 305$a$-$c$, and comprise the processes of computing covariance matrices $COV_i$ (305$a$), removing the background spectral contribution ("whitening pixels") from a HSI scene (305$b$), and detecting known targets with reference signatures (305$c$). The numbers of operations ("ops") required for each process in the chain are indicated. As described above, previous approaches to computing and decontaminating $COV_i$), and computing the decontaminated spectral covariance matrix ($COVD_i$), require on the order of $2*P*D^2$ operations, where the number of scene pixels P may be $10^6$ to $10^7$ or larger and the spectral dimensions D may be of size 100-480. Computing the $COV_i$ requires significant computations, particularly when many pixels and spectral dimensions are available, and can be the most processing intensive part of the HSI processing chain.

Described herein are examples of systems and methods for significantly reducing the required number computational operations for computing COVD, through the use of highly efficient, adaptive, sparse pixel sampling, COV decontamination and optionally dimension reduction, ensuring only a minimum level of sampling of pixels is required to compute a COV matrix that may be inverted stably. Iterative pixel sampling facilitates this comparatively much smaller required number of pixels and computational operations. The stability of the inverted $COVD_i$ may be tested using standard matrix inversion numerical tests.

III. Example ICED Approach

Figure 4:
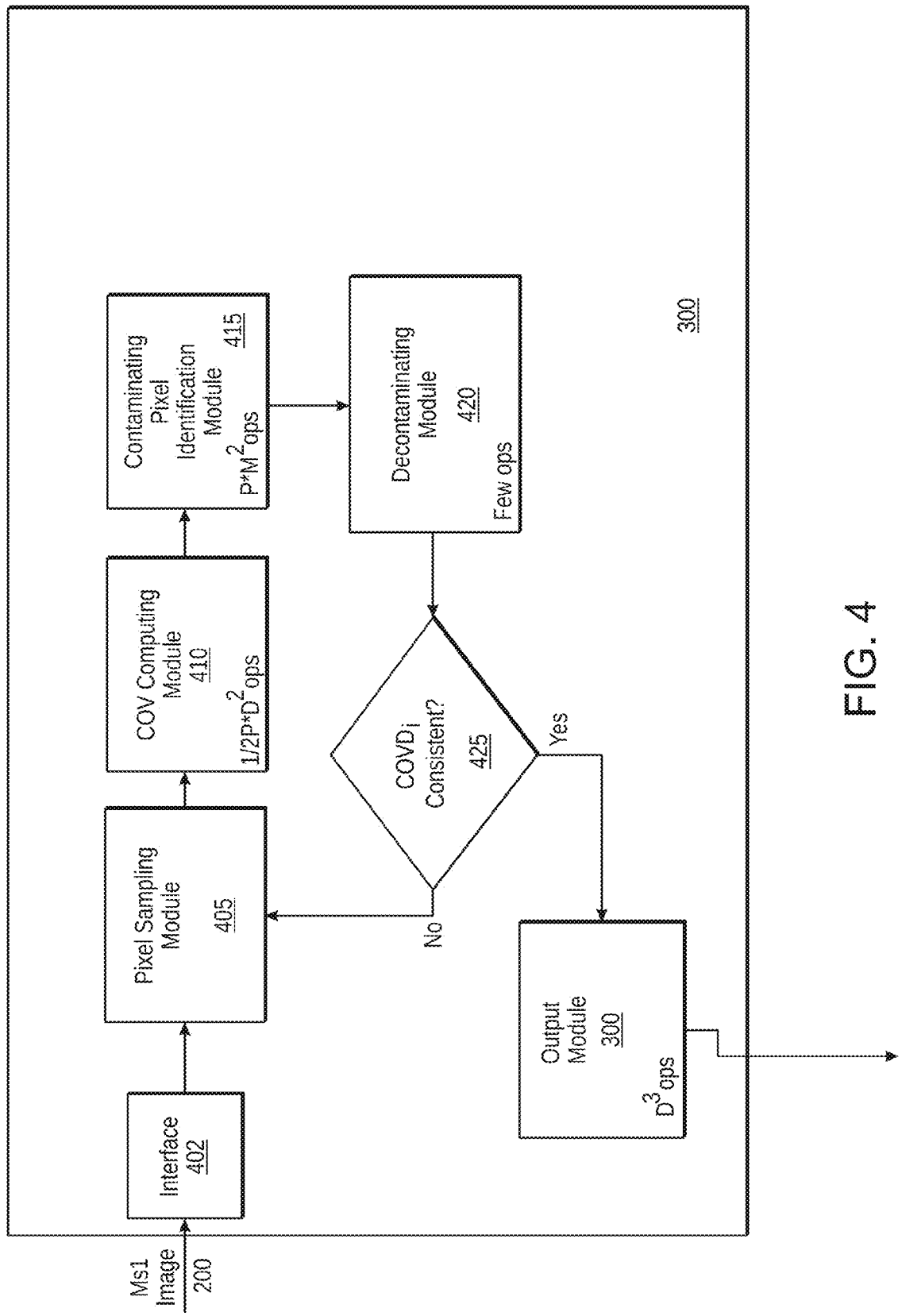
FIG. 4 is a functional block diagram of an example of a covariance estimator.

FIG. 4 shows an example implementation of covariance estimator 300 for implementing examples of the independent covariance estimation and decontamination ("ICED") approach to estimating background spectral content in a hyperspectral scene. The covariance estimator 300 includes an interface 402, pixel sampling module 405, a covariance matrix computing module 410, a contaminating pixel identifying module 415, a decontaminating module 420, consistency checking module 425, and an output module 330 communicatively coupled to one another as shown.

The ICED covariance estimator 300 is provided HSI data 200 at interface 402 from a HSI sensor for a plurality of scene pixels in a hyperspectral scene. The hyperspectral imaging data 200 includes, for example, a HSI data cube including the spectra of the plurality P of scene pixels in the hyperspectral scene, indicative of radiation absorbed by, or emitted from, scene materials in a plurality D of spectral dimensions (i.e., wavebands), including background materials and possibly anomalies and/or targets.

The pixel sampling module 405 receives the HSI data cube including the spectra of the plurality P of scene pixels in the hyperspectral scene, and from that samples N sets of scene pixels for the initial iteration of the example ICED method, where each of the N sets contains a small fraction sf of the entirety of P scene pixels. For example purposes only, sf may be initialized at 0.33% of the scene pixels, and N could be initialized at 3 sample sets of this size. As will be described, these values may be incremented iteratively as the ICED method proceeds, based on an evaluation of the ability of a later computed decontaminated covariance matrix to be stably inverted and produce consistent background spectral content estimates for downstream HSI processing.

The covariance matrix computing module 410 then computes a scene covariance matrix $COV_i$ for each of the N pixel sets, Each $COV_i$ describes the variance and correlation of the spectral content of the associated scene pixel set from the mean of the spectral content of the HSI scene for that pixel set. The $COV_i$ includes information indicating the variance of each spectral channel among the set of pixels, as well as the correlation between wavelengths among that set of pixels. The dimension of the covariance matrix is D×D (a square matrix in the number of spectral dimensions). For example, if a particular material is bright in 'channel 1' and 'channel 5', and that material is common in the scene, then the $COV_i$ will show a high correlation between channel 1 and channel 5 (i.e., large values for covariance matrix elements (1,5) and (5, 1)).

The contaminating pixel identifying module 415 then identifies contaminating pixels from among the sampled pixels using a subset M of potentially significantly reduced spectral dimension. Subset M includes at least one of the plurality D of spectral dimensions used to acquire the scene pixel data. An example method for identifying such pixels involves computing an anomaly score $RX_M$ for each of the sampled scene pixels, using a subset of M spectral dimensions that is fewer than the plurality D of spectral dimensions, and comparing the anomaly score $RX_M$ for each of the sampled pixels to an anomaly score threshold. The anomalies, or contaminants in the context of these ICED methods, comprise pixels having a different spectrum than spectra common to a plurality of scene pixels of the HSI scene.

Approaches for efficiently detecting anomalous, or in the context of these examples "contaminating", pixels are described in co-pending U.S. patent application Ser. No. 14/467,272 filed Aug. 25, 2014, entitled "RAPID ANOMALY DETECTION", the contents of which are incorporated by reference in their entirety, and are only summarized here. An alternative to processing in the D spectral wavebands, would be to either transform the data into D basis vectors or to operate on data which had already been transformed into D basis vectors. Basis vectors are linear combinations of the wavebands, and the data transformation consists of a linear transform from D wavebands to D basis vectors that is common knowledge to those skilled in the art. For such data, a subset M of the total D basis vectors may be used to do the detection, starting with a small M and using only enough basis vectors to generate consistent covariance matrices. The method involves using an anomaly equation including a set of terms sorted by descending importance, for each pixel in the plurality of scene pixels, in computing an intermediate anomaly score based on a portion of the set of terms. The remaining terms of the set are not used to compute the intermediate anomaly score and are of less importance than the terms included in the portion. The method further includes comparing the intermediate anomaly scores to a threshold, identifying scene pixels having intermediate anomaly scores less than the threshold as empty scene pixels that do not include anomalies (contaminants.) The method then eliminates the empty scene pixels from the plurality of scene pixels, and updates the anomaly equation to include one or more of the unused terms to form an updated anomaly equation if the number of eliminated scene pixels is less than a specified fraction of a total number of scene pixels and a number of computed intermediate anomaly scores is less than a counter. The method then, for each scene pixel remaining in the plurality of scene pixels, computes an updated intermediate anomaly score using the updated anomaly equation, and compares the updated intermediate anomaly scores to an updated threshold, the updated threshold being greater in value than the previous threshold. Scene pixels are identified as having updated intermediate anomaly scores less than the updated threshold as empty scene pixels that do not include contaminants. These empty scene pixels are eliminated from the remaining scene pixels, for which a full dimension anomaly score is computed based on the set of terms of the anomaly equation if the number of eliminated scene pixels is greater than or equal to the specified fraction of the total number of scene pixels or the number of intermediate anomaly scores computed is greater than or equal to the counter. The method then declares which scene pixels include anomalies (or, again, contaminants in this ICED method context) based on comparisons of the computed full dimension anomaly scores to a full dimension anomaly score threshold that is greater in value than the threshold and the updated threshold.

In some examples, the subset M is selected from the D eigenvectors of the spectral covariance matrix such that the members of subset M have eigenvalues above a predetermined or dynamically updated threshold.

In other examples, computing the anomaly score $RX_M$ for each of the sampled scene pixels may be performed by computing M eigenvector coefficients by unmixing the principal components from each scene pixel and dividing the resulting unmixing coefficients by the square root of the eigenvalue corresponding to the Mth eigenvector, in order to obtain M whitened coefficients. Then, the anomaly score $RX_M$ may then be computed as the dot product of the M whitened coefficients with themselves. Provided M eigenvector coefficients computed for each scene pixel, an anomaly score may be computed from the largest (top) M (e.g. 3-5) principal components of the hyperspectral scene. These are the M eigenvectors of the Cov with the largest corresponding eigenvalues of the D eigenvector/eigenvalue pairs computed for the $Cov_i$. If the M eigenvector coefficients are not provided, they may be calculated from the HSI data cube. The coefficients are calculated by unmixing the principal components from each scene pixel and dividing the resulting unmixing coefficient by the square root of the eigenvalue corresponding to the eigenvector. The result is each pixel has M whitened coefficients. The dot product of the M coefficients with themselves is equivalent to the output of the anomaly score for M coefficients.

In yet other examples, computing the anomaly score $RX_M$ for each of the sampled scene pixels may be performed by computing M coefficients for an arbitrary set of basis vectors by unmixing the basis vectors from each scene pixel. Then, the covariance may be computed of the set of M coefficients for all scene pixels, and the anomaly score $RX_M$ may be computed as a Reed-Xiaoli anomaly score.

The identifying module 415 declares scene pixels below the threshold to be not of interest. These pixels are declared empty scene pixels that do not contain contaminants and are flagged for no further processing. The foregoing contaminating pixel identification process may be performed iteratively, including updating of the threshold, until sufficiently few scene pixels remain or until a maximum number of loops are executed. A counter may be provided (e.g., as an operator defined parameter) or incremented to determine whether sufficiently few scene pixel remain or whether a maximum number of loops is obtained. Scene pixels with scores above the threshold are considered to contain contaminants and the identifying module 415 returns these scene pixels or an indicator that contaminants are detected in the scene pixels.

Decontaminating module 420 then may subtract from each of the $COV_i$ the spectral contribution of the contaminating pixels, in order to derive an associated plurality of decontaminated covariance matrices COVDi. Notably, this requires significantly fewer calculations than recomputing the covariance matrix using all of the scene pixels and spectral dimensions.

Consistency checking module 425 then evaluates whether the plurality of decontaminated covariance matrices $COVD_i$ resulting from the iterative processing so far are consistent enough to proceed. The consistency checking module 425 evaluates the $COVD_i$ for the N sets of pixel samples to determine whether a predetermined COVD accuracy threshold representative of acceptable results has been achieved, through analysis of the variation of $COVD_i$ among the sets of samples. If the consistency of the plurality of $COVD_i$ is determined to be acceptable, output module 430 then may average the plurality of $COVD_i$ to derive a final decontaminated spectral covariance matrix COVD.

If the accuracy of the plurality of $COVD_i$ is determined to be unacceptable, an indication of this is returned to pixel sampling module 405, for another iteration of the process of sampling, computing, identifying, decontaminating, and consistency checking steps for a greater number of scene pixels, and optionally an incrementally greater number of M spectral dimensions. For example, if the consistency check indicates an additional iteration is required to derive more accurate $COVD_i$, consistency checking module 425 may store the $COVD_i$ determined to be unacceptable for use in the consistency check of the next iteration, and pixel sampling module 405 may sample an additional number $N_{(i+1)}$ of pixel sets preferably distinct from the number $N_i$ sampled on the previous iteration. Both sets of $COVD_i$ and $COVD_{i+1}$ may be used in the consistency check of the next iteration. In these examples, $COVD_i$ from the previous iteration may be stored rather than discarded, since the accuracy threshold might be inconsistent with the number of pixels being used for that scene. That is, all COVDs might have similar variation from the mean and have variation larger than the threshold, so additional COVDs may be generated for a larger consistency check.

In some examples, the variation may be evaluated among all the $COVD_i$ compared to a mean COVD. $COVD_i$'s that show a similar variation from the mean could be stored and $COVD_i$'s that show an unusually large variation from the mean could be discarded. Consistency checking module 425 would stop iterating and output module 430 could then calculate an average COVD when the variation among the retained $COVD_i$ and the number of retained COVD ($N_{retained}$) satisfied the condition that the (variation)* $(N_{retained})^{1/2}$ (the expected variation in the average) < ($Threshold_{accuracy}$).

In other examples, the consistency checking module 425 recognizes that the number of pixels initially chosen was too small. Existing COVDs could be aggregated, providing a resultant COVD for a larger pixel set, and then additional larger pixel sets could be chosen for the new resampling COVDs, resulting in less variation among them. This process applies the decontamination steps less frequently than having large numbers of small pixel sets and eventually using the same number of pixels in getting to a sufficiently accurate COVD via the consistency check and averaging described previously.

The applicants have discovered that decontamination enables sparse sampling to generate spectral background estimates that approximate full covariance calculations using a fraction of the computational operations required by full covariance methods. In some ICED method examples, the total number of scene pixels aggregately sampled is less than ten percent (10%), and preferably less than one percent (1%) of the total available pixels in the HSI scene. In some examples, a full dimensional anomaly score RX may be used to decontaminate the $COV_i$, while in others significantly reduced spectral dimensions may be used. In yet other examples, consistency checking module 425 merely verifies that a certain percentage of the scene pixels have been sampled, and does not compare the variation among $COVD_i$.

In comparison to the approximately $2*P*D^2$ operations required by prior HSI processing systems to calculate an initial covariance ($0.5*P*D^2$ ops), identify contaminants ($P*D^2$ ops) and recalculate the covariance without contaminants ($0.5*P*D^2$ ops), implementations described herein only require $N_{sets}*sf*P(\frac{1}{2}D^2+M^2)$ calculations, where $N_{sets}$ represents the number of sampled pixel sets being used in the calculation (e.g., 3 sets), sf represents a small fraction (e.g., 0.33%) of the pixels, and M represents a reduced number of wavebands (e.g., 5-8), which provide a useful COVD. Purely for example purposes, if $P=10^6$ and $D=150$, prior processes for computing COVD using all P and D would require $4.5 \times 10^{10}$ operations. But using the ICED approach, in a first scenario where M=8 and $N_{sets}*sf=0.04$, required operations would be $5.3 \times 10^8$. In a second scenario where M=5 and $N_{sets}*sf=0.01$, required operations would be only $1.5 \times 10^8$. Assuming such reduced sampling and dimension reduction yields a stably invertible COVD (which has been experimentally proven), these examples demonstrate 80-300× reduction in required computational operations.

It should be noted that the ICED process described above uses a general concept COV variation to decide if the $COVD_i$ are sufficiently consistent. However for a specific application, such as a search for a spectral reference using a Matched Filter, other techniques may be used. In such examples, a signal to clutter ratio SCR may be computed for each spectral reference using the following formula $SCR_i = (s-\mu)^T COVD_i^{-1}(s-\mu)$ where s is the spectral reference and $\mu$ is the scene spectral mean using each sample $COVD_i$. If each $SCR_i$ for each sample $COVD_i$ is close enough to the mean of the $SCR_i$, the iterative scene pixel sampling may cease and the samples averaged into a final COVD that is sufficiently accurate for this Matched Filter.

Referring again to FIG. 4, the final COVD, comprising data estimating the spectral background of the HSI scene, is communicated by output module 430 to the next HSI processing element. In the HSI processing chain illustrated in FIG. 3, principal components of the final COVD may then be determined for the anomaly detector 310 and/or target detector 308.

The above-described systems and methods can be implemented in digital electronic circuitry, in computer hardware, firmware, and/or software. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit suitable for use in a computing environment to carry out the features and functions of various examples discussed herein. A computer program can be deployed to be executed on one computer or on multiple computers at one site.

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implement that functionality.

The covariance estimator 300 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., of covariance estimator 300) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

IV. Post-ICED HSI Processing

As noted, COVD may be used by anomaly detector 310 in detecting anomalies in scene pixels making up a hyperspectral scene. An anomaly is spectrum that is not known beforehand but is different than spectra common to the scene pixels. Example methods may compare each pixel's deviation from the mean to the scene covariance, in order to identify "unusual" pixels. Detecting an anomaly is contrasted with detecting a target which requires the unique spectrum or "signature" associated with the target to be known beforehand. Anomaly detection is a critical to the operation of a HSI system in a denied territory. Anomaly detection provides the capability for the system to learn new targets, as scene pixels detected, initially, as anomalies may become targets whose spectrum is known on a subsequent flight.

A common type of anomaly filter detector is the Reed-Xioli or "RX" anomaly detection filter, which provides a means for determining an anomaly filter score RX, given by $$RX = (x-\mu)^T \text{Cov}^{-1}(x-\mu) \quad \text{Eq. 1}$$

and $$\text{Cov}_{ij} = \frac{1}{N_{pixels}} \sum_{pixels} (x_i - \mu_i)(x_j - \mu_j) \quad \text{Eq. 2}$$

where x is a pixel's spectral vector, p is the scene spectral mean, i,j are wavebands, and $\text{Cov}^{-1}$ is the inverted covariance matrix.

RX anomaly detection filters are effective, but require a lot of computation for each scene pixel. Computation of the RX anomaly detection filter score for all scene pixels requires $P*D^2$ operations, where P is the number scene pixels and D is the number of dimensions or bands. A hyperspectral scene typically includes $10^6$ scene pixels. A HSI sensor typically collects 200-400 narrow spectral bands over a given sensing regime (e.g., visible and near infra-red (VNIR)/short wave infrared (SWIR) and long wave infrared (LWIR)). Therefore, anomaly detection is ordinarily a very computation intensive process. As previously noted, approaches for efficiently detecting anomalies in scene pixels making up a hyperspectral scene are described in co-pending U.S. patent application Ser. No. 14/467,272.

Spectral covariance matrices may also be used in target detection, wherein each pixel's spectrum is compared to a given target spectrum. Detecting a target requires the unique spectrum or "signature" associated with the target to be known beforehand. Target detection is a critical to the operation of a HSI system in a denied territory. A common form of target detector is the spectral Matched Filter or "MF" target detection filter. (See Equation 3.) A matched filter score or "score" may be computed, in part, from the unique spectrum of the spectral reference. Presence of a target typically is associated with a high matched filter score.

$$MF = \frac{(x-\mu)^T \text{Cov}^{-1}(s-\mu)}{\sqrt{(s-\mu)^T \text{Cov}^{-1}(s-\mu)}} \quad \text{Eq. 3}$$

Where x is the pixel spectral vector, s is the reference spectra, $\mu$ is the scene mean spectra, and $\text{Cov}^{-1}$ is the stably inverted covariance matrix.

The most commonly used form of MF uses the principal components of the COVD of the HSI data. (See Equation 4.)

$$MF = \frac{\sum_{i=1}^{D} \frac{p_i t_i}{\lambda_i}}{\sqrt{SCR}} \quad \text{Eq. 4}$$

where $p_i = (E_i)^T(x-\mu)$ and $t_i = (E_i)^T(s-\mu)$

Where eigenvalues are denoted as, $\lambda_i$ eigenvectors as, $E_i$ and $$SCR = \sum_{i=1}^{D} \frac{t_i^2}{\lambda_i}.$$

The MF approach is effective, but also requires a lot of computation for each scene pixel. Computation of the MF target detection filter for all scene pixels requires $P*D^2$ operations, and is further multiplied by the number of reference signatures employed (e.g., single digits to thousands.) The inventors of the subject matter of this application have previously described approaches for efficiently detecting targets in scene pixels making up a hyperspectral scene, in co-pending U.S. patent application Ser. No. 14/561,873 filed Dec. 5, 2014, entitled "Rapid Iterative Detection". The contents of this application are incorporated by reference in their entirety. The approaches described therein include tailoring an approximation of a target score for each scene pixel, individually, based on the "intermediate target score." The intermediate target score may be computed using a portion of the terms used to compute a target score, herein referred to as a "full dimension target score" The target score computed by the MF target detection filter described above is an example of a full dimension target score. The intermediate target score is the sum using a few terms of the eigenvectors and eigenvalues in the numerator. Note that the denominator, SCR, is the same for every pixel and is computed once for each scene and reference spectrum. This is beneficial because the SCR is computed in the full dimension with little processing. By computing the SCR in the full dimension the top PC contributions can be ranked. Ranking the contributions may be used in selecting which terms form the intermediate target score.

An Adaptive Coherence Estimator (ACE) is another example of a full dimension target score, or a slight variant (RACE) using the signed square root of the standard ACE. (See equation 5.) The score is referred to by either name where the C could be either coherence or cosine.

$$RACE = \frac{(x-\mu)^T \text{Cov}^{-1}(s-\mu)}{\sqrt{(x-\mu)^T \text{Cov}^{-1}(x-\mu)} \sqrt{(s-\mu)^T \text{Cov}^{-1}(s-\mu)}} \quad \text{Eq. 5}$$

The numerator is the same as MF but the denominator incorporates the Reed-Xioli (RX) anomaly measure. Like MF, ACE/RACE also requires a lot of computation for each pixel. In fact, ACE/RACE requires more computation because the RX calculation in the denominator must be done for every pixel. Both MF and ACE/RACE are often used together, because the false alarms tend to be different. While MF detection finds pixels with large magnitude in the direction of the target, ACE/RACE finds pixels with direction close to the target (independent of magnitude.)

V. Proof of Concept

Using example sensor flight test data, it has been shown that some examples of the ICED provide a highly efficient and accurate estimate of the spectral content in the background of a HSI, producing results rivaling full covariance Matched Filter and RX anomaly scoring, but with over ninety-nine percent (99%) scene pixel elimination and M as low as 3 terms. Results were good at 1% sparse pixel sampling and comparable to full covariance at 4%, when the COV is decontaminated. Even when no decontamination was employed, the iterative scene pixel sampling process doubled MF and RX scores.

Figure 5:
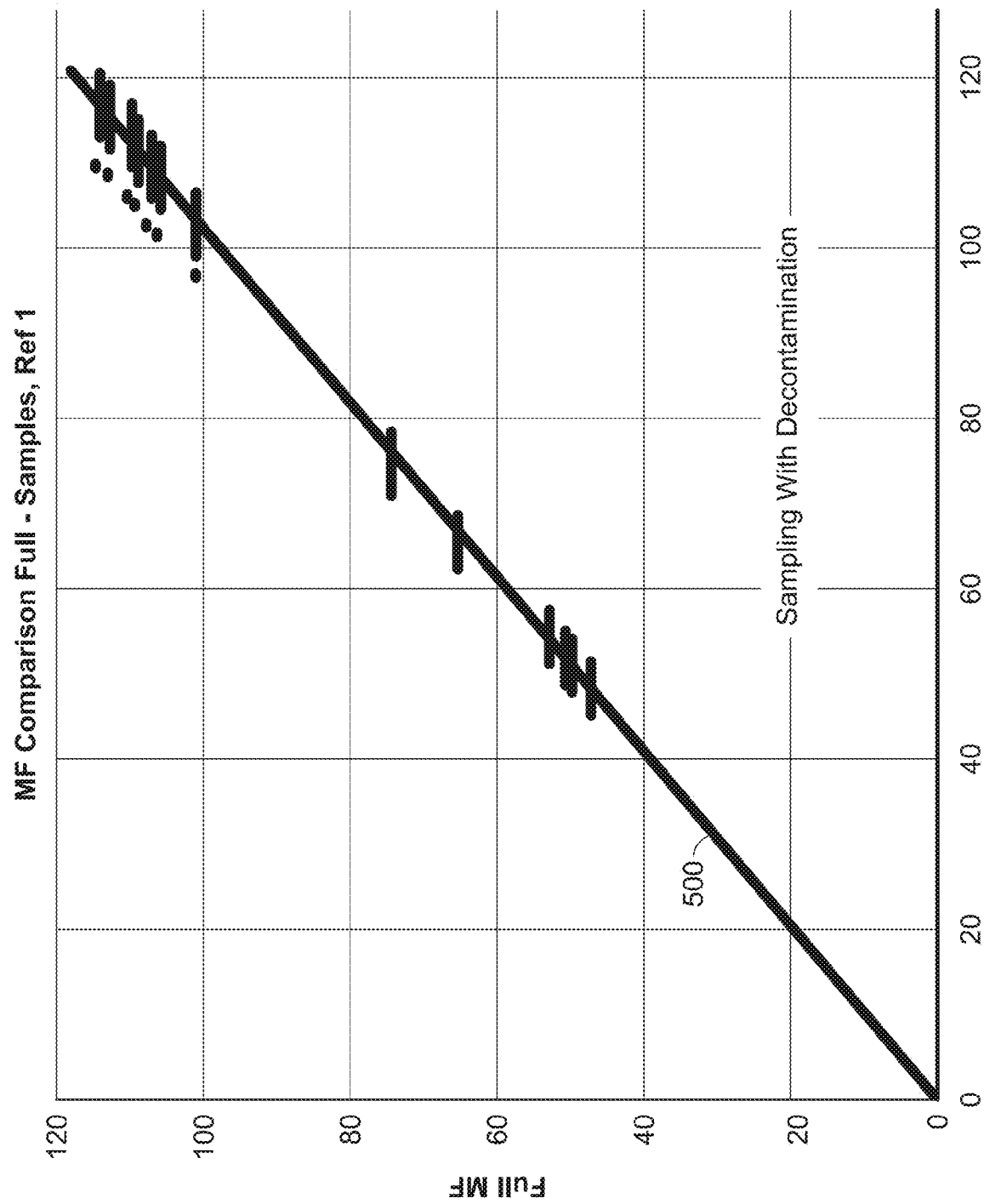
FIG. 5 is a plot comparing results of prior full covariance Matched Filter target detection methods to ICED MF approach with reduced sampling.
Figure 6:
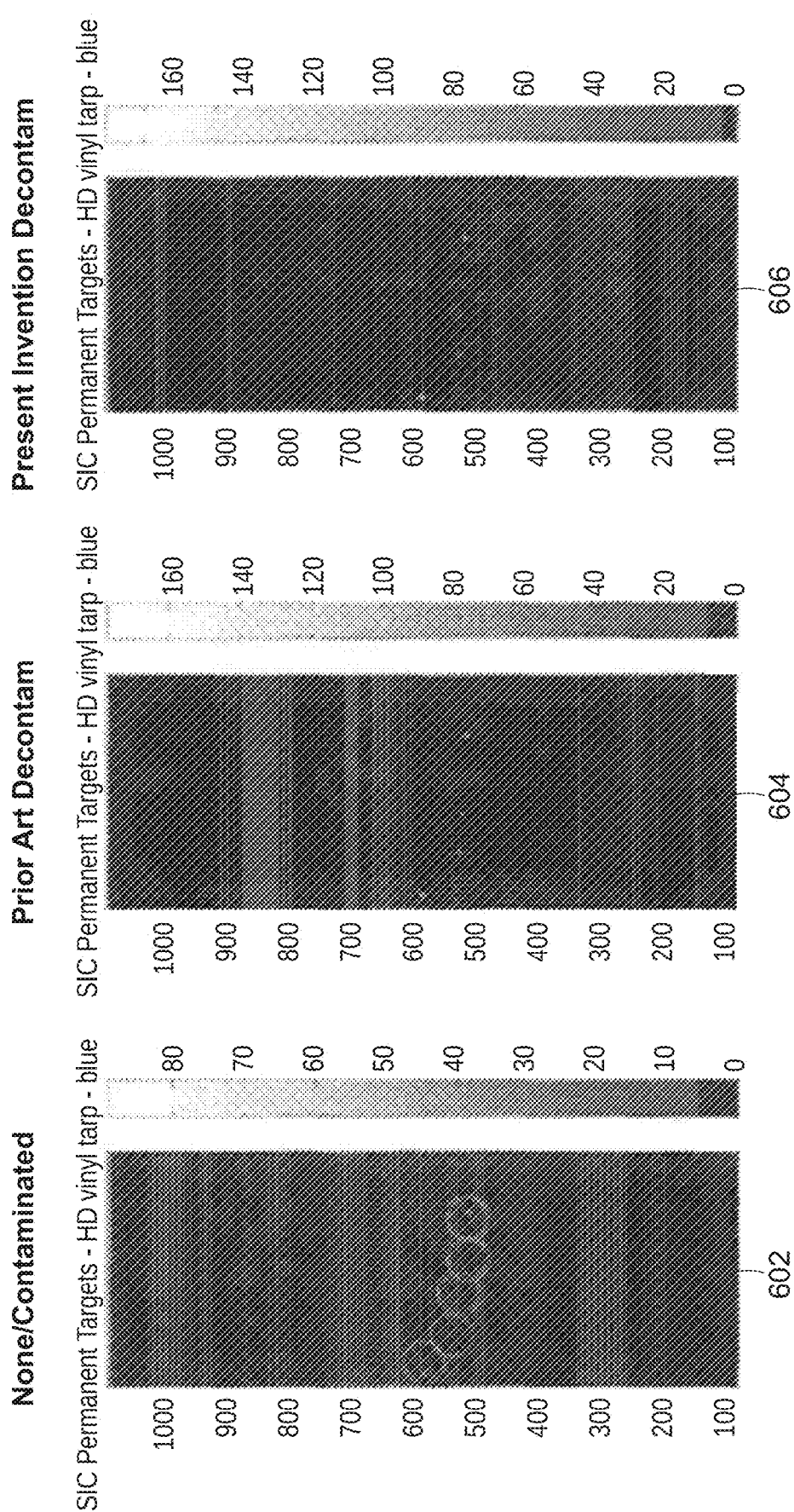
FIG. 6 is an MF imaging results comparison among prior approaches with and without decontamination and an example ICED MF method.

FIG. 5 shows nearly identical results plotting full (all pixels and spectral dimensions) COV MF scores against 4% pixel sampling using the ICED approach. All ICED points are within 10% of full COV. The solid line 500 demonstrates this parity. FIG. 6 demonstrates that ICED doubles (image 606) the MF score (from 80 to 160) for a Blue Vinyl Tarp reference, using all the scene pixels (image 602), but not decontamination. Also plotted is the result (image 604) of a prior art estimation using decontamination, which shows similar accuracy, but at a much higher computational operations burden.

Figure 7:
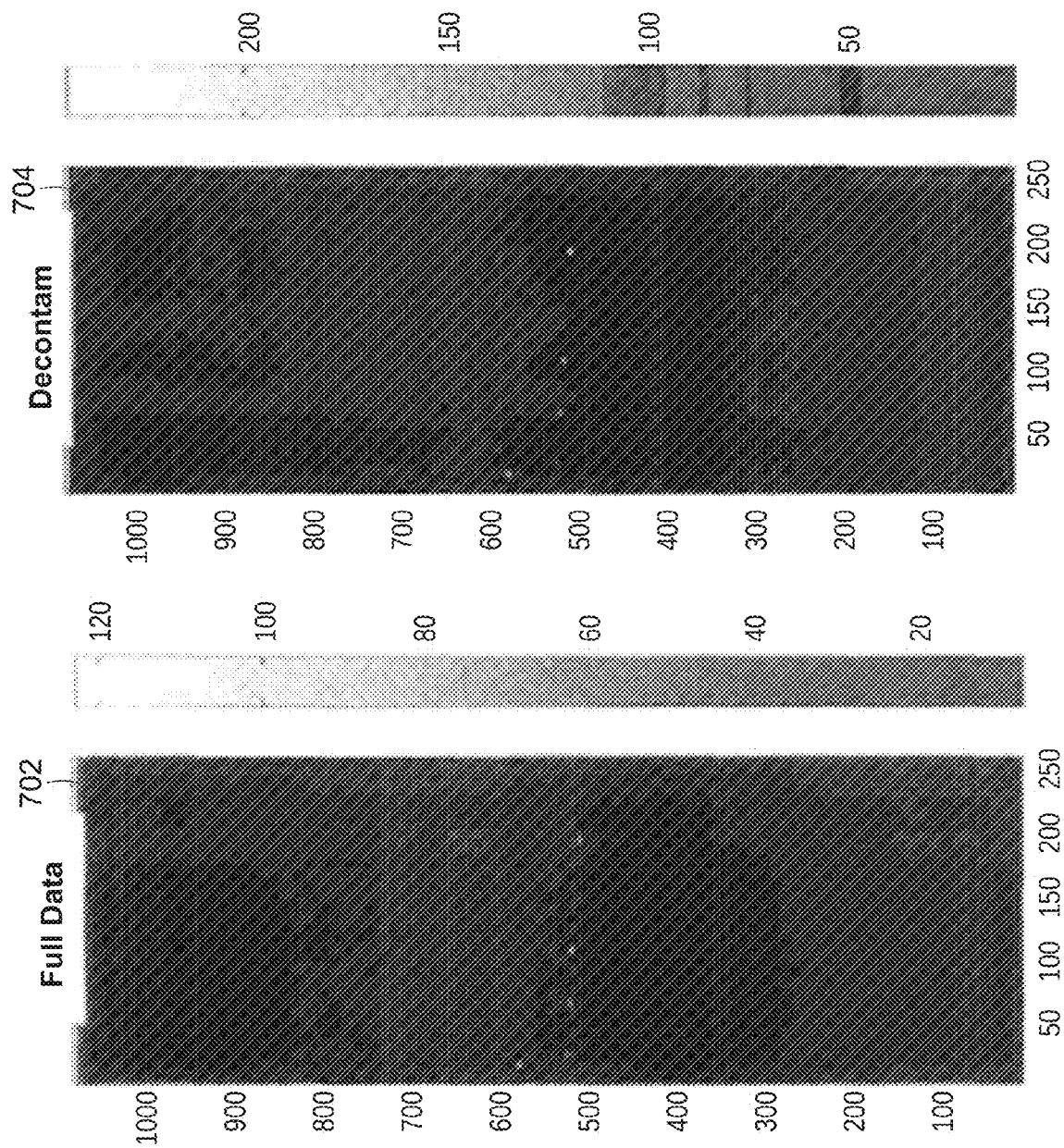
FIG. 7 is a RX anomaly imaging results comparison between a prior full covariance RX method and an example ICED RX method.
Figure 8:
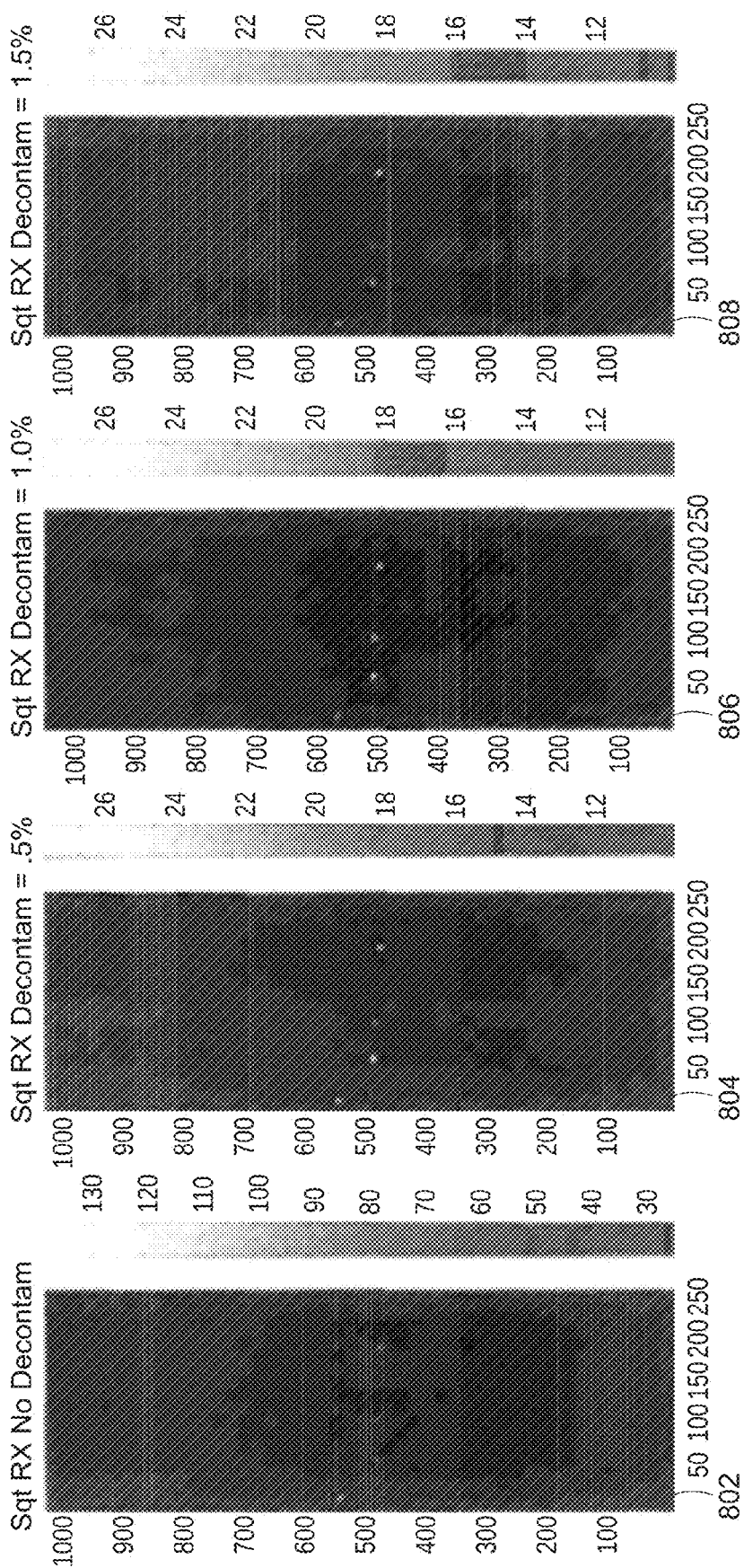
FIG. 8 is a RX anomaly imaging results comparison among a prior full covariance RX method without decontamination and three ICED RX methods with increasing levels of pixel decontamination.

FIG. 7 illustrates that ICED similarly doubles RX anomaly scores (full COV prior RX method image 702 compared to ICED image 704), in a significantly more computationally efficient manner. ICED extends detection tail where potential targets are located, and better separates from typical background clutter pixels. FIG. 8 compares a full COV prior RX approach (image 802) to ICED at increasing levels (0.5%, 1%, and 1.5%) of decontamination (images 804, 806 and 808.) These images also demonstrate that the performance improvement is achieved by only using 0.5% contaminating pixel elimination.

"Comprise," "include," and/or plural forms of each are open ended and include the listed parts and can include additional parts that are not listed. "And/or" is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. An improved method of estimating background spectral content in a hyperspectral scene, the method comprising:
   in a covariance estimator of a hyperspectral image processor provided with a hyperspectral scene, acquired by a hyperspectral sensor, comprising spectra of a plurality P of scene pixels indicative of radiation absorbed by, or emitted from, scene materials in a plurality D of spectral dimensions:
     sampling N pixel sets each comprising a small number of scene pixels;
     computing a scene covariance matrix for each of the N pixel sets, each scene covariance matrix representing the variance and correlation of the spectral content of the associated pixel set from the mean of the spectral content of the hyperspectral scene for that pixel set;
     identifying contaminating pixels from among the sampled pixels using a number M of spectral dimensions from the plurality D of spectral dimensions;
     decontaminating from each of the covariance matrices the spectral contribution of the contaminating pixels, thereby deriving an associated plurality of decontaminated covariance matrices;
     checking whether the consistency of the plurality of decontaminated covariance matrices is acceptable;
     if the consistency of the plurality of decontaminated spectral covariance matrices is acceptable, computing a final decontaminated spectral covariance matrix by averaging the plurality of decontaminated spectral covariance matrices; and
     if the consistency of the plurality of decontaminated spectral covariance matrices is unacceptable, iteratively repeating the sampling, computing, identifying, decontaminating, and consistency checking steps for a greater number of scene pixels.

2. The method of claim 1, wherein iteratively repeating the pixel sampling step comprises sampling an additional number of pixel sets distinct from the pixel sets already sampled.

3. The method claim 1, wherein iteratively repeating the consistency check comprises storing the decontaminated spectral covariance matrices that were found to have unacceptable consistency and including the stored decontaminated spectral covariance matrices in the consistency check of the next iteration.

4. The method of claim 1, wherein the total number of scene pixels aggregately sampled is less than the plurality P of the scene pixels, in particular less than ten percent (10%) of P, and preferably less than one percent (1%) of the scene pixels.

5. The method of claim 1, wherein iteratively identifying contaminating pixels comprises, optionally, incrementing the M spectral dimensions.

6. The method of claim 1, wherein identifying contaminating pixels further comprises:
   computing an anomaly score $RX_M$ for each of the sampled scene pixels using a subset M of spectral dimensions fewer than the plurality D of spectral dimensions; and
   comparing the anomaly score $RX_M$ for each of the sampled pixels to an anomaly score threshold.

7. The method of claim 6, wherein subset M comprises a subset of the D eigenvectors of the spectral covariance matrix, each member of subset M having an eigenvalue above a threshold.

8. The method of claim 6, wherein computing the anomaly score $RX_M$ for each of the sampled scene pixels comprises:
   computing M eigenvector coefficients by unmixing the principal components from each scene pixel and dividing the resulting unmixing coefficients by the square root of the eigenvalue corresponding to the $M^{th}$ eigenvector to obtain M whitened coefficients; and
   computing $RX_M$ as the dot product of the M whitened coefficients with themselves.

9. The method of claim 6, wherein computing the anomaly score $RX_M$ for each of the sampled scene pixels comprises:
   computing M coefficients for an arbitrary set of basis vectors by unmixing the basis vectors from each scene pixel;
   calculating the covariance of the set of M coefficients for all scene pixels; and computing $RX_M$ as the Reed-Xiaoli anomaly score.

10. The method of claim 1, wherein decontaminating the covariance matrices comprises subtracting the spectral contribution of the contaminating pixels from the covariance matrices.

11. A system for estimating background spectral content in a hyperspectral scene, the system comprising:
   a memory having computer executable instructions thereupon;

at least one interface receiving a hyperspectral imaging data for a plurality of scene pixels of a hyperspectral scene; and a covariance estimator coupled to the memory and the at least one interface, the computer executable instructions when executed by the covariance estimator cause the covariance estimator to:

sample N pixel sets each comprising a small number of scene pixels;

compute a scene covariance matrix for each of the N pixel sets, each scene covariance matrix representing the variance and correlation of the spectral content of the associated pixel set from the mean of the spectral content of the hyperspectral scene for that pixel set;

identify contaminating pixels from among the sampled pixels using at least one of the plurality D of spectral dimensions;

decontaminate from each of the covariance matrices the spectral contribution of the contaminating pixels, thereby deriving an associated plurality of decontaminated covariance matrices;

check whether the consistency of the plurality of decontaminated covariance matrices is acceptable;

if the consistency of the plurality of decontaminated spectral covariance matrices is acceptable, compute a final decontaminated spectral covariance matrix by averaging the plurality of decontaminated spectral covariance matrices; and if the consistency of the plurality of decontaminated spectral covariance matrices is unacceptable, iteratively repeat the sampling, computing, identifying, decontaminating, and consistency checking steps for a greater number of scene pixels.

12. A tangible non-transitory computer-readable storage medium having computer readable instructions stored therein for estimating background spectral content in a hyperspectral scene, which when executed by one or more processors provided with a hyperspectral imaging data for a plurality of scene pixels of a hyperspectral scene, cause the one or more processors to:

sample N pixel sets each comprising a small number of scene pixels;

compute a scene covariance matrix for each of the N pixel sets, each scene covariance matrix representing the variance and correlation of the spectral content of the associated pixel set from the mean of the spectral content of the hyperspectral scene for that pixel set;

identify contaminating pixels from among the sampled pixels using at least one of the plurality D of spectral dimensions;

decontaminate from each of the covariance matrices the spectral contribution of the contaminating pixels, thereby deriving an associated plurality of decontaminated covariance matrices;

check whether the consistency of the plurality of decontaminated covariance matrices is acceptable;

if the consistency of the plurality of decontaminated spectral covariance matrices is acceptable, compute a final decontaminated spectral covariance matrix by averaging the plurality of decontaminated spectral covariance matrices; and if the consistency of the plurality of decontaminated spectral covariance matrices is unacceptable, iteratively repeat the sampling, computing, identifying, decontaminating, and consistency checking steps for a greater number of scene pixels.

* * * * *